United States Patent
Thill et al.

(10) Patent No.: US 7,860,040 B2
(45) Date of Patent: Dec. 28, 2010

(54) DISTRIBUTED SYNCHRONIZATION METHOD AND SYSTEM

(75) Inventors: Jean-Claude Thill, Fontenay Aux Roses (FR); Laurent Fachau, Clichy (FR)

(73) Assignee: Thales (FR)

( * ) Notice: Subject to any disclaimer, the term of this patent is extended or adjusted under 35 U.S.C. 154(b) by 1059 days.

(21) Appl. No.: 11/569,663

(22) PCT Filed: May 4, 2005

(86) PCT No.: PCT/EP2005/052056

§ 371 (c)(1),
(2), (4) Date: Nov. 27, 2006

(87) PCT Pub. No.: WO2005/117311

PCT Pub. Date: Dec. 8, 2005

(65) Prior Publication Data

US 2007/0230434 A1     Oct. 4, 2007

(30) Foreign Application Priority Data

May 28, 2004   (FR) .................................. 04 05809

(51) Int. Cl.
*H04W 4/00* (2009.01)
*H04J 3/24* (2006.01)

(52) U.S. Cl. ....................... 370/314; 370/349

(58) Field of Classification Search ............... 370/314, 370/321, 322, 326, 329, 337, 348, 349, 350
See application file for complete search history.

(56) References Cited

U.S. PATENT DOCUMENTS

| 6,985,750 | B1 * | 1/2006 | Vicknair et al. | 455/519 |
| 7,068,746 | B1 * | 6/2006 | Stichter | 375/356 |
| 2001/0022823 | A1 | 9/2001 | Renaud | |
| 2004/0005902 | A1 | 1/2004 | Belcea | |
| 2006/0285516 | A1 * | 12/2006 | Li et al. | 370/329 |
| 2008/0240165 | A1 * | 10/2008 | Balassanian et al. | 370/503 |
| 2008/0291855 | A1 * | 11/2008 | Bata et al. | 370/311 |

* cited by examiner

*Primary Examiner*—Diane Mizrahi
(74) *Attorney, Agent, or Firm*—Lowe Hauptman Ham & Berner, LLP

(57) ABSTRACT

A distributed synchronization method in a communication network is disclosed. A number of stations exchange messages between themselves. A synchronization pattern characteristic of the clock reference of the sender is inserted into each message transmitted by a sender. The clock reference of each station is updated with the clock reference that it receives from another station of the network if, and only if, the received time is leading the clock reference. The update is done by calculating the difference $\Delta X = T'a - Ta$ between the time of sending T'a of the message received by a station A and the time of reception Ta of the same message by the station B, and applying a correction $0 < \Delta Y \leq \Delta X$ if the received time of sending is leading by a quantity of at least $\tau$ ($\Delta X > \tau > 0$).

20 Claims, 2 Drawing Sheets

DISTRIBUTED SYNCHRONIZATION METHOD AND SYSTEM

RELATED APPLICATIONS

Figure 1:
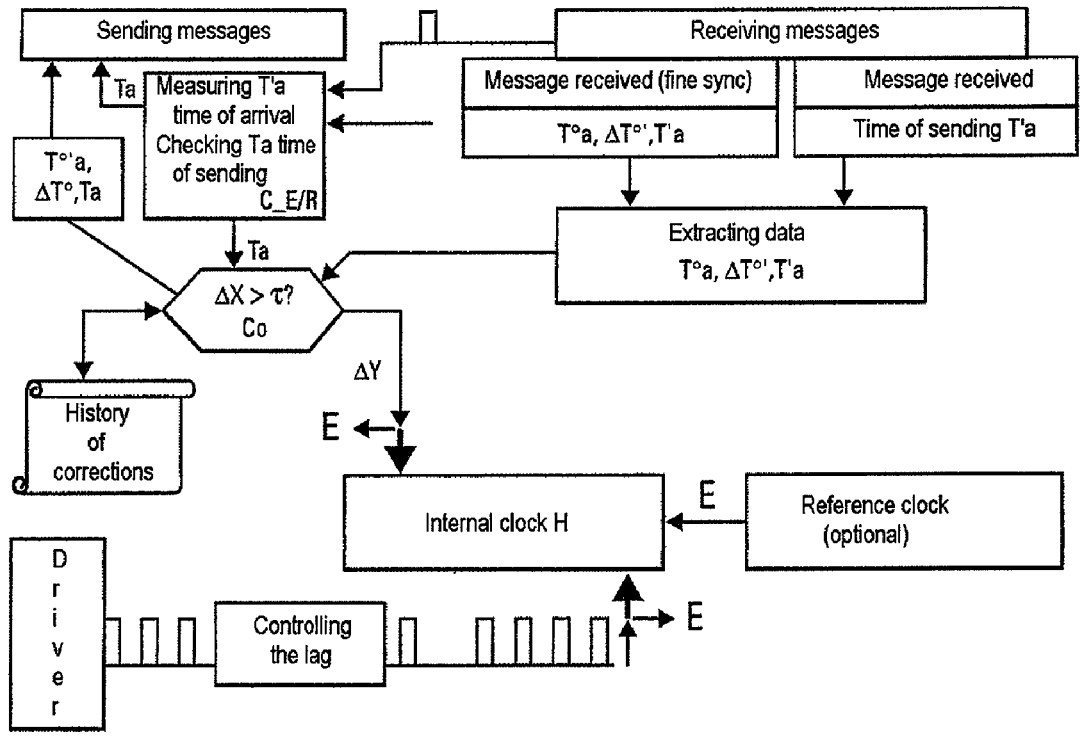

The present application is based on International Application No. PCT/EP2005/052056, filed on May 4, 2005, which in turn corresponds to France Application Number 04 05809, filed May 28, 2004, and priority is hereby claimed under 35 USC §119 based on these applications. Each of these applications are hereby incorporated by reference in their entirety into the present application.

The invention relates to a distributed synchronization method and system.

It applies for example to ad hoc networks. It is also used in wireless networks of the Large Scale Wireless Network type with access or transmission requiring global synchronization.

It applies to radio networks.

Numerous synchronization procedures in the radio networks require a common and accurate time reference at each node of the network. In the description, the term node or "station" is used to denote any entity of the network, implemented in hardware or software form, which can be the point of entry or the point of exit (end) of an exchange or transmission of information between stations.

Guaranteed transmission times, the possibility of broadcast services in multi-channel networks in the presence of hidden terminals, lead to coordinating the access of several stations and having a policy of preallocation of the resources in the form of blocks of time and of frequencies. Among other things, and in a non-exclusive manner, this applies to the dynamic TDMA (Time Division Multiple Access) methods, of which one example is the mesh mode of the IEEE 802.16A standard.

Along the same lines, the use of directional antennas in an ad hoc network often leads to coordinating the transmissions, and therefore, to using a common time reference.

Moreover, the networks can use frequency-hopping type transmission techniques with time-dependent transec laws (laws for making the change of frequencies pseudorandom and protecting transmission). Here, too, a common clock reference is required.

This common clock reference is more or less accurate depending on the system. Any lack of accuracy means adding guard or synchronization times which soon become intolerable with respect to network performance in terms of transmission delays or capacity.

Various procedures for "distributed synchronization in ad hoc networks" are currently known from the prior art.

Apart from solutions using a common external reference such as GPS (Global Positioning System) but which then depend on the availability of the latter, the method most frequently used is the synchronization tree method. One station is, for example, chosen as the clock reference or synchronization master. The other stations are progressively synchronized on that reference station, by constructing, in a decentralized manner, a synchronization tree. The stations in the neighbourhood to the reference station are synchronized on the latter, then on the stations located two hops away which are synchronized by selecting a station one hop away as the parent, and so on.

This method presents a number of drawbacks when it comes to mobile networks. In practice, if the network split up, it becomes necessary to choose, in the part not containing the reference station, another reference station. If the networks merge again, the two reference stations cannot be maintained.

Moreover, even if the network remains connected, since the positions of the stations change, the synchronization tree must be modified, without creating local loop. In the case where the reference station is destroyed, this situation must be detected (so there must be a procedure for maintaining presence of the station that is insensitive to loops of the count-to-infinity type), and this must be followed by the decentralized election of a new station. This involves quite difficult and fairly unresponsive procedures.

Other methods studied in the prior art are based on a weighting of the times of the adjacent stations. In certain conditions chosen from the weighting matrix, the system converges. This convergence is, however, slow and ill-suited to mobile networks.

The synchronization method and system mainly use the transmissions (interchanges) between the stations connected by mainly radio links. The method uses neither a reference station, nor an external reference in normal operating conditions, the synchronization being able to appear at any time (in the absence of a master).

The invention relates notably to a distributed synchronization method in a communication network comprising a number of stations exchanging messages between themselves. It is characterized in that it comprises at least the following steps:
  inserting into each message transmitted by a sender, a synchronization pattern characteristic of the clock reference of the sender, or explicitly indicating the time of sending,
  updating the clock reference of each station with the clock reference that it receives from another station of the network if, and only if, the received time is leading the clock reference, the updating being done as follows:
    calculating the difference $\Delta X = T'a - Ta$ between the time of sending T'a of the message received by a station A and the time of reception Ta of the same message by the station B,
    applying a correction $0 < \Delta Y <= \Delta X$ if the received time of sending is leading by a quantity of at least $\tau (\Delta X > \tau > 0)$.

The invention offers in particular the following advantages:
  The method does not entail explicitly designating one or more reference stations and it is totally distributed, in other words, based on local information,
  It automatically supports the mobile networks and the creation or the destruction of links and is therefore from this point of view extremely robust,
  It makes it possible to take into account or disregard the correction of the propagation times,
  It makes it possible to include stations having an accurate external reference such as stations provided with an external reference time such as a GPS receiver, and in this case, align the network on this time,
  It supports the fragmentation and merging of subnetworks which can occur because of the lack of the connectivity between the stations, and, in this case, favors, in terms of capacity, the parts where there is a station having an external reference time.

Figure 2:
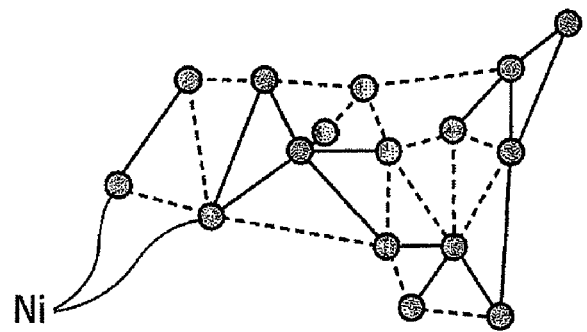
Figure 3:
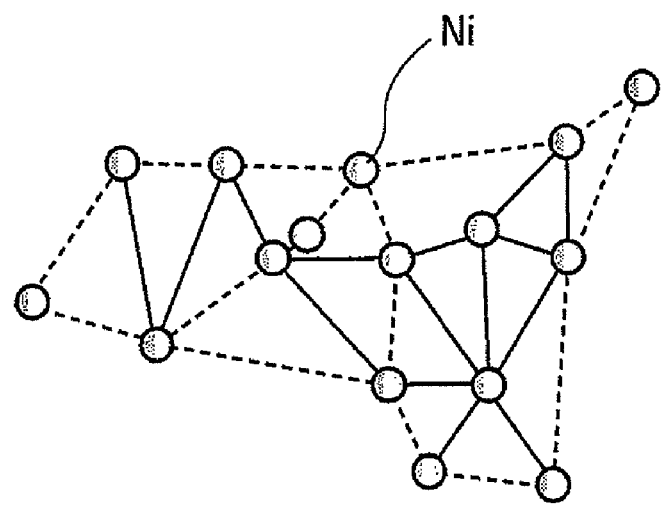
Figure 4:
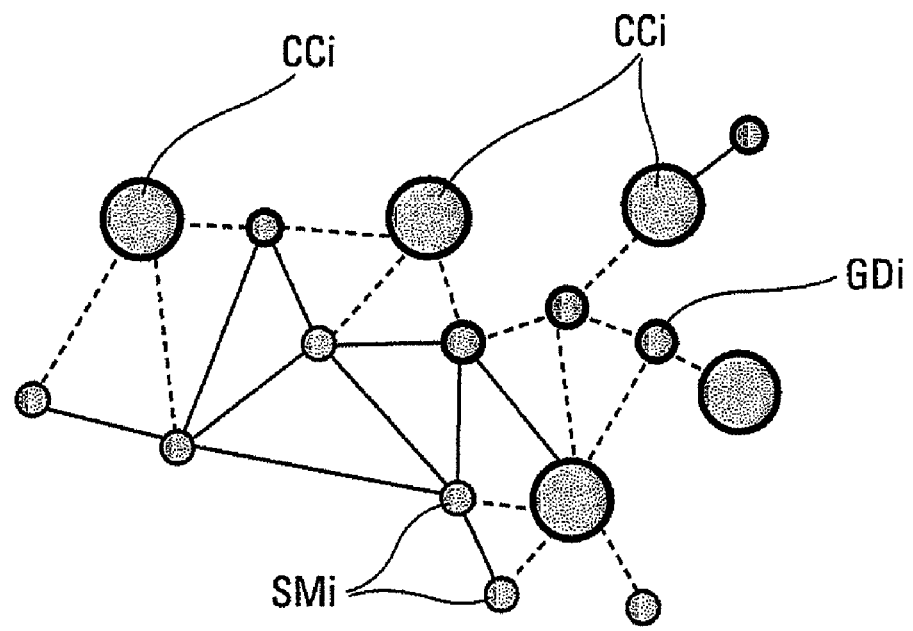

Other characteristics and advantages of the present invention will become more apparent from reading the description of an exemplary embodiment given by way of illustration, and by no means limiting, with appended figures which represent:

FIG. 1, an exemplary architecture of the system, according to the invention,

FIG. 2, an example of rough synchronization in an ad hoc network,

FIG. 3, an example of fine synchronization in an ad hoc network,

FIG. 4, an example of system organized in clusters.

In order to better understand the principle implemented by the method, the description that follows is given within the context of a network comprising a set of nodes or stations, mobile or otherwise, interconnected by radio transmission means. The set of nodes typically forms a connected network. Each node has an internal clock and the clocks are assumed to be not necessarily synchronized initially and to drift over time.

FIG. 1 diagrammatically represents a synchronization system according to the invention. The system is located on a station or a node Ni. It comprises, for example, the following elements:

An internal clock H, the time of which is controlled by a driver and an optional lag control device (for example deleting driver pulses) such that the drift of the time is always negative, A device C_E/R which receives the messages and has the particular function of measuring the time of reception and controlling the time of sending of the messages. This device also receives the information from the internal clock, A device Co for correcting the time H, dependent on measurements of the times of arrival and the times of sending of the messages. This device receives the clock information (T, ΔT) transported by the messages and calculates the synchronization data to be transported, An optional external reference clock.

The way the system operates differs according to the organization of the network to which it is applied, some exemplary applications of which are given below.

The description uses the following notation conventions: the values indexed Z' theoretically indicate the measurements and the calculations made in the remote station and Z in the local station.

FIG. 2 diagrammatically represents an exemplary ad hoc network. It comprises a number of nodes or stations interlinked by uniform or non-uniform communication links, respectively designated in the figure by solid or dotted lines. The nodes can be mobile or otherwise and each have an internal clock. The clocks are assumed to be not necessarily synchronized initially and to drift over time. The communication links are, for example, radio links. The set of these connections typically forms a connected network.

The method synchronizes the clocks of all the nodes via exchanges between a station (node) and the connected adjacent stations.

The method presupposes that the message exchanges between stations are performed as follows:

a station A which receives a transmission from the station B determines the time of sending from B (measured in the clock B) and the time of reception of the message in its clock (clock A). This is, for example, performed explicitly when the message sent by B contains its time of sending or another indicator. This can also be implicit when the message is sent in a synchronized manner relative to a frame or an agreed time. The time of arrival of the message in the station A can be measured by itself (A). The difference between the time of sending and the time of reception is, in particular, due to the difference between the times of the clocks at the moment of the transmission, the drift during the transmission and the propagation time. In the example of FIG. 2, only the synchronization of the clocks, to within the propagation time, is taken into account. This is commonly denoted by the expression "rough synchronization". Even if the system is initially synchronized, in the absence of realignment the time of each station will drift and the network will become unsynchronized.

A first policy entails being realigned on each message received. If there are many exchanges, the network can remain synchronized, but the system is unstable. The time of this network will slow down considerably and in an uncontrolled manner, because of the propagation time delaying the transmissions. The second effect of this procedure is that, if two stations locally exchange numerous messages, here, too, a rapid, uncontrolled local drift will occur and the group of stations will be unsynchronized relative to the other stations. In the case where the clocks are synchronous and do not drift, the procedure will result in the clocks being modified because of the propagation times.

To resolve the problem, each station of the network is synchronized, for example, on the transmission from a station B, only if the received transmission is leading; in other words, if in the station B the message is transmitted at $T_0$ (clock of B), it is received at $T_0-X$ (with $X \geqq 0$) in the clock of A. This implies that the clock of B is leading, in view of the fact that the propagation times can only delay the message. Synchronization will be achieved, for example, only if the lead is greater than a given value to take account of the measurement errors.

To obtain this synchronization, the method, for example, carries out the following steps:

the device Co calculates the difference $\Delta X = T'a - Ta$ between the time of sending T'a of the message received and the time of reception Ta of the same message, the method applies a correction $0 < \Delta Y \leqq \Delta X$, if the received time of sending is in advance of a significant quantity $\tau$ with $\Delta X > \tau > 0$, for example $\Delta Y = \Delta X - \tau$.

The stations A and B have symmetrical roles.

Provided that each station regularly transmits a message to its neighbors, the network remains synchronized, to within the propagation time, the accuracy depending only on the rate of sending from each station (the drift of the clocks between the transmissions). In particular, the network depends little or not at all on the stability of the links (inasmuch as the network remains globally connected) and on the order in which the messages are exchanged.

According to this method, the time of a station of the network cannot drift more quickly than the fastest of the clocks of the network and more slowly than the slowest. In other words, if the clocks have a drift of between +D and -D when they are isolated, the drift of the time of the network station will remain +/-D. To return to the preceding example, if the clocks are synchronized and do not drift, the proposed time-setting procedure will not make them drift. This characteristic of the proposed method is important, because it is necessary to be able to estimate the maximum drifts between isolated stations or isolated parts of networks, to be able to resynchronize them as quickly as possible. Thus, in the case where two stations continuing to communicate remain isolated for less than X minutes, if the system tolerates a drift of X minutes without synchronization for a station, the stations will naturally return to the network with no particular procedure.

Without departing from the framework of the invention, the steps described above at the station level apply at station group level. If there is a set of networks, a synchronization of this network will be obtained by aligning the network A on the network B, if the latter is leading.

To illustrate the principle by an exemplary application in everyday life, imagine a meeting where each participant has his time and you want each participant to have the same time. Each is on the move and compares his time and adopts the leading time. Clearly, each will ultimately have the same time. Adopting the lagging time (delay time), for example, will not allow for convergence if the propagation times are not negligible, even if the clocks do not drift.

Fine Synchronization

The method also offers the facility to correct the propagation times. This variant, designated "fine synchronization" as represented in FIG. 3, mainly uses a round-trip measurement to correct the propagation times between two stations. The fine synchronization links are represented in the figure by broken lines.

For this, the method typically comprises the following conventional steps:

the station A measures the arrival time difference $T_1$ of the messages with B as has been described previously and B does the same by measuring the arrival time difference $T_2$ with the messages from A. The stations exchange these differences $$T_1 = \Delta H + \delta$$

$$T_2 = -\Delta H + \delta$$

Where $\Delta H$ corresponds to the errors of the clocks in the stations and $\delta$ to the propagation time between the two stations.

The proposed method offers notably the following two characteristics:
- It presents no requirement for synchronism in the exchanges between the stations (apart from a rate that is fast enough to be compatible with the desired drift and accuracy)
- It makes it possible to limit the number of neighbors with which a station must be fine synchronized, without in any way imposing a strict pattern on this synchronization chart, which must simply maintain the network connectivity.

For this, each station includes a table with which to memorize the trend of the synchronizations (table of corrections) made within the station.

In fine synchronization mode, the device Co of the station A calculates the difference $T_1 = T°a - T°a$, the difference between the time of sending by B and the time of reception of the first message received by A at $T°a$ and sent at $T°'a$ by B. $T_1$ is corrected (using the table of corrections) by the corrections of the clock made on the station A from the time of reception $T°a$ and the time of sending $T'a$ of a new message from A to B, to obtain $\Delta T°' = T_1$ −corrections. The time of sending $T'a$ of the new message and the difference $\Delta T°'$ are transmitted (with $T°a$) to the remote station concerned.

The device Co of the station B receiving at the time Ta (time of reception of the new message), the values $\Delta T°'$, $T°a$ and Ta from the remote station A, corrects $\Delta T°'$ by the corrections made between $T°a$ and Ta, to obtain $\Delta T_3$ and measures $\Delta T_2 = T'a - Ta$, the difference between $T'a$ and Ta. If $\Delta T_2 - \Delta T_3$ is greater than a value $\tau'$, with $\tau'$ tending towards zero for example, the device Co applies a correction, with $\Delta T_2 - \Delta T_3$ measuring twice the lead of the remote station corrected by the propagation times.

The principle used is therefore in this sense similar to the rough synchronization described previously, and each station adopts the most leading time between itself and its neighbors. Here, however, the knowledge of the time of the neighbors is more accurate because of the correction of the propagation times.

The proposed fine synchronization method is therefore compatible with the rough synchronization, in the sense that a station that is in rough synchronization mode will not disrupt the stations in fine synchronization mode. In practice, a rough synchronization can provoke a modification only if its clock is leading and therefore acting in the same direction as the fine synchronization.

Since the synchronization is established between stations, there is no need to apply the procedure between all the links, or to use a fixed structure like a synchronization tree. It is enough for all the links retained for the fine synchronization to pass through all the nodes of the network in a connected way as in the exemplary structure given in FIG. 3.

FIG. 4 diagrammatically represents an example of fine synchronization which is applied to a hierarchically-organized architecture. The fine synchronization (links shown by broken lines in the figure) can be applied between cluster leader CCi and cluster member station SMi, and between cluster leaders by also including the double gateways GDi.

It will also be noted that two network parts initially not interconnected and applying a fine synchronization as indicated will automatically reconstruct a synchronization chart by setting up a single synchronization link between them, without there being a need to modify the existing synchronization charts.

Since the drift of the networks is dependent only on the drift of the clocks, the reconfiguration times, which normally depend on the difference between the network clocks, are bounded by these drifts. The phases of breakdown of connectivity do not cause any uncontrolled drift and are therefore less critical.

Recognition of Stations in Radio Silence Mode

The method applies also to networks containing stations in radio silence mode, that is, stations that are capable of receiving but not of transmitting.

A station in radio silence mode adopts the time received from an adjacent station without taking account of the fact that the station is leading or lagging.

When there is a splitting up of the network and therefore relative drift of the connected parts of the network, the method limits the synchronization only if the received time is not lagging too far behind the local time. This makes it possible for the station to remain synchronized on the most leading network. The threshold is chosen, for example, according to the drift of the clocks and the propagation times of the system.

Recognition of Stations Provided with External Reference Clock References

It is desirable for a set of interconnected stations, some of which have a reference external reference, for example stations that are synchronized on a GPS, to remain synchronized on this reference time and for all the stations also to be synchronized on this time. Apart from the reference time present in certain stations, all the stations are provided with a clock counter (internal time) maintained by a driver which sends pulses at regular intervals, for example.

The method then comprises the following steps:

The stations, as previously, have an internal time. A driver maintains this clock with a certain accuracy of +/−A. This clock is realigned each time a message is received by the messages in advance and sometimes by round-trip measurements to correct the propagation times, as indicated previously for the fine or rough synchronization. The external reference time of the station appears as a particular realignment message, and obeys the same criteria as a message from a neighbourhood station.

To force the realignment on this external time, the internal driver is designed to bring about a natural lag of the internal clock. In these conditions, the stations that have a reference time will naturally lead the stations that do not have the same and the reference time will be propagated in the network naturally without any signaling being necessary.

If we imagine that the internal time is maintained on the pulses from the internal driver, the method typically eliminates one pulse from time to time for the drift to be, for example, 0/−2A instead of +A/−A. The way in which the sending of the pulses is modified depends, for example, on the structure of the driver.

This method applies equally for both fine synchronization and rough synchronization.

Merging Networks

According to a variant of embodiment, the method according to the invention can be used to resolve the problem of synchronization in parts of networks.

It makes it possible to automatically maintain a common time despite changes of network topology. It was indicated previously how the parts of networks that have an external reference time, for example a GPS time, are naturally synchronized on this time.

The method according to the invention makes no assumptions as to the nature of the communication means that link the stations. They can be uniform links within a frequency range, or different means, and the method makes it possible to obtain an accurate common time.

The only assumption is that the stations can intercommunicate. However, this time setting is often used to enable the stations to communicate over a given communication means; for example, the communication means can be a TDMA (time division multiple access) network with frequency evasion or EVF.

In fact, these communication systems have internal procedures for detecting stations that would not be synchronized with sufficient accuracy and so enable the application of the indicated method to be initiated. However, a station that looks in this way for unsynchronized adjacent parts must devote some of its resources to that, resources that cannot be used for useful interchanges. These procedures, which are not part of the invention, involve consumption of the capacities of the system to the detriment of the traffic to be handled. The less capacity that is used for such detection the longer the resynchronization times become.

Clearly, the disparate parts of a network, provided that each part has an external reference time, will remain synchronized to each other, even if all exchanges cease between these parts. If, however, a connected part of a network has no station that has this external time, the network time of this part will drift relative to the other parts.

The method according to the invention makes it possible to limit the loss of capacity in the networks that have external time reference, and to concentrate on those that have none.

In practice, according to the principle of in advance synchronization and the proposed method, the networks with external reference time will never have to be synchronized. It is therefore possible to limit the search for adjacent networks to those networks that do not have this reference. Resource consumption for this function will be limited to situations considered as degraded or to the initialization phases. However, to implement this function, the stations of the network need to know that they have no external reference in the network. This requires a minimum of signaling and can result in not inconsiderable delays, but the propagation time of this signaling is not critical, since it is unrelated to the synchronization provided elsewhere by the proposed method. The situation is very different for a master station for which the loss must be quickly detected on pain of loss of synchronization.

Another aspect is that the method naturally provides a certain immunity to synchronization replay. Intrinsically, a replay is lagging and therefore, given the method, cannot disrupt the network where it is retransmitted. On an adjacent network, if the latter is in advance, it has no effect. If it is lagging, the replay will provoke leading, but in fact will also contribute to the synchronization of the system since the method looks for leading networks.

Without departing from the framework of the invention, the method can also be implemented on an ancillary network which will be used to synchronize the main network. Although mainly applicable to the networks where the stations play a similar role, it can naturally be extended to non-uniform networks or to sets of networks.

The transmission means may or may not require the stations to be synchronized in order to perform the interchanges. In this case, the method according to the invention makes it possible to maintain this synchronization.

The method is also applied in the initial synchronization acquisition phase, a procedure specific to the transmission means used.

The invention claimed is:

1. A distributed synchronization method in a communication network comprising a number of stations exchanging messages between themselves, comprising the following steps:

inserting by a sender station into each message transmitted by the sender station a synchronization pattern characteristic of the clock reference of the sender station, updating the clock reference of each station with the clock reference that each station receives from another station of the network if, and only if, the time received is in advance the clock reference, the update being done as follows:

calculating by a receiving station, the difference $\Delta X = T'a - Ta$ between the time of sending $T'a$ of the message received by a station A and the time of reception $Ta$ of the same message by the station B, applying, by the receiving station, a correction $0 < \Delta Y <= \Delta X$ if the received time of sending is in advance by a quantity of at least $\tau(\Delta X > \tau > 0)$.

2. The method as claimed in claim 1, wherein the error correction between two stations is performed as follows:

on the synchronization links set up between the different stations of the network, $T_1 = T'°a - T°a$ is calculated, being the difference between the time of sending from a station B and the time of reception of a message received by A at ° a and sent by B at T° 'a, A corrects $T_1$ by the intermediate corrections made since $T°a$ and the time of sending $T'a$ by A of a new message, to obtain $\Delta T°' = T_1$—corrections, A transmits in the message $T'a$, $T'°a$ and $\Delta T°'$ to the remote station concerned B, B corrects $\Delta T°'$ by the clock corrections made between $T'°a$ and $Ta$ to obtain $\Delta T_3$, B determines $\Delta T_2 = T'a - Ta$ if $\Delta T_2 - \Delta T_3$ is greater than 0, then B corrects the clock of the station with $\Delta T_2 - \Delta T_3$ measuring twice the advance of the remote station A corrected by the propagation times.

3. The method as claimed in claim 2, wherein each station comprises an internal clock having a drift +/−A and the network has a driver maintaining this clock by sending pulses, the sending of the pulses is adapted to maintain the drift of the internal clock within a given range, −B; −B-2A.

4. The method as claimed in claim 2, wherein the network is a radio network.

5. The method as claimed in claim 2 to a network comprising one or more stations in radio silence mode.

6. The method as claimed in claim 2 to a network having a GPS on one or more stations, the GPS clock messages being treated as received time messages.

7. The method as claimed in claim 1, wherein a station comprising an internal clock having a drift +/−A and the network having a driver maintaining this clock by sending pulses, the sending of the pulses is adapted to maintain the drift of the internal clock within a given range.

8. The method as claimed in claim 7, wherein the range is.

9. The method as claimed in claim 8, wherein the network is a radio network.

10. The method as claimed in claim 8 to a network comprising one or more stations in radio silence mode.

11. The method as claimed in claim 7 to a network having a GPS on one or more stations, the GPS clock messages being treated as received time messages.

12. The method as claimed in claim 8 to a network having a GPS on one or more stations, the GPS clock messages being treated as received time messages.

13. The method as claimed in claim 7, wherein the network is a radio network.

14. The method as claimed in claim 7 to a network comprising one or more stations in radio silence mode.

15. The method as claimed in claim 1, wherein the network is a radio network.

16. The application of the method as claimed in claim 1 to a network comprising one or more stations in radio silence mode.

17. The application of the method as claimed in claim 1 to a network having a GPS on one or more stations, the GPS clock messages being treated as received time messages.

18. The distributed synchronization system as claimed in claim 1, comprising an external clock reference.

19. A distributed synchronization system in a network comprising a number of stations exchanging messages between themselves, comprising:
- a internal clock H, the time of which is controlled by a driver and an optional delay control device, such that the drift of the time is always negative,
- a device C_E/R which receives the messages and the main function of which is to measure the time of reception and control the time of sending of the messages,
- a device Co for correcting the time H, receiving the clock information (T, $\Delta T$) transported by the messages and calculating the synchronization data to be transported, the device Co being designed to:
    calculate the difference $\Delta X = T'a - Ta$ between the time of sending T'a of the message received by a station A and the time of reception Ta of the same message by the station B,
    apply a correction $0 < \Delta Y <= \Delta X$ if the received time of sending is in advance of by a quantity of at least $\tau (\Delta X > \tau > 0)$.

20. The distributed synchronization system as claimed in claim 19, wherein the network is a radio network.

* * * * *